United States Patent
Hannington

(10) Patent No.: US 7,060,351 B2
(45) Date of Patent: Jun. 13, 2006

(54) ADHESIVE ARTICLE WITH IMPROVED AIR EGRESS

(75) Inventor: Michael Hannington, Madison, OH (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/742,654

(22) Filed: Dec. 21, 2000

(65) Prior Publication Data

US 2001/0031353 A1 Oct. 18, 2001

Related U.S. Application Data

(60) Provisional application No. 60/199,244, filed on Apr. 24, 2000.

(51) Int. Cl.
*B32B 7/12* (2006.01)
*B32B 15/04* (2006.01)
*D02G 3/00* (2006.01)

(52) U.S. Cl. .................... 428/343; 428/352; 428/346; 428/354; 428/358

(58) Field of Classification Search ............... 428/343, 428/352, 346, 354, 41.8, 40.2
See application file for complete search history.

(56) References Cited

U.S. PATENT DOCUMENTS

| | | | |
|---|---|---|---|
| 2,191,704 A | 2/1940 | Bennet | 91/68 |
| 3,301,741 A | 1/1967 | Henrickson et al. | 161/119 |
| 3,331,729 A * | 7/1967 | Danielson et al. | |
| 3,413,168 A | 11/1968 | Danielson et al. | 156/71 |
| 3,554,835 A * | 1/1971 | Morgan | 156/234 |
| 4,289,821 A | 9/1981 | Gray, III et al. | 428/172 |
| 4,322,450 A | 3/1982 | Gray, III et al. | 427/44 |
| 4,397,905 A | 8/1983 | Dettmer et al. | 428/180 |
| 4,427,732 A | 1/1984 | Gray, III et al. | 428/172 |
| 4,556,595 A | 12/1985 | Ochi | 428/143 |
| 4,713,273 A | 12/1987 | Freedman | 428/40 |
| 4,721,638 A | 1/1988 | Matsuguchi et al. | 428/40 |
| 4,761,320 A | 8/1988 | Coburn, Jr. | 428/167 |

(Continued)

FOREIGN PATENT DOCUMENTS

DE 3417746 11/1985

(Continued)

OTHER PUBLICATIONS

Webpage for carbon atom: http://hyperphysics.phy-astr.gsu.edu/hbase/pertab/c.html#c1; Date: Sep. 30, 2004.*

(Continued)

*Primary Examiner*—Victor S. Chang
(74) *Attorney, Agent, or Firm*—Renner, Otto, Boisselle & Sklar, LLP

(57) ABSTRACT

This invention relates to an adhesive article which provides air egress. Air egress is provided by supplying a mute, such as areas of no initial adhesion for the air to flow out from under the construction. The invention relates to an adhesive article comprising a facestock having a front surface and a back surface, a continuous layer of adhesive having an upper surface and a lower surface wherein the upper surface of the adhesive layer is adhered to the back surface of the facestock, and a plurality of spaced-apart non-adhesive material which is in contact with the lower surface of the adhesive layer wherein the lower surface of the adhesive layer has a Sheffield roughness of at least about 10 and the adhesive article provides air egress. The invention also relates to methods of preparing the adhesive articles, These articles have usefulness as industrial graphics images, as well as decorative coverings, etc. The articles provide air egress and optionally repositionability and slideability.

24 Claims, 6 Drawing Sheets

U.S. PATENT DOCUMENTS

| | | | | |
|---|---|---|---|---|
| 4,771,891 A | 9/1988 | Sorensen et al. | ............ | 206/459 |
| 4,889,234 A | 12/1989 | Sorensen et al. | ............ | 206/459 |
| 4,971,854 A | 11/1990 | Hinishi et al. | ............... | 428/195 |
| 5,141,790 A | 8/1992 | Calhoun et al. | ............... | 428/40 |
| 5,194,299 A | 3/1993 | Fry | ............................ | 427/194 |
| 5,268,228 A | 12/1993 | Orr | ............................ | 428/343 |
| 5,273,805 A | 12/1993 | Calhoun et al. | ............ | 428/156 |
| 5,296,277 A | 3/1994 | Wilson et al. | ................. | 428/40 |
| 5,344,681 A | 9/1994 | Calhoun et al. | ............... | 428/42 |
| 5,344,693 A | 9/1994 | Sanders | ....................... | 428/167 |
| 5,362,516 A | 11/1994 | Wilson et al. | ............ | 427/207.1 |
| 5,449,540 A | 9/1995 | Calhoun et al. | ............... | 428/42 |
| 5,462,765 A | 10/1995 | Calhoun et al. | ............ | 427/199 |
| 5,487,929 A | 1/1996 | Rusincovitch, Jr. et al. | .. | 428/40 |
| 5,585,178 A | 12/1996 | Calhoun et al. | ............ | 428/343 |
| 5,589,246 A | 12/1996 | Calhoun et al. | ............ | 428/120 |
| 5,591,290 A | 1/1997 | Walter et al. | ................ | 156/152 |
| 5,650,215 A | 7/1997 | Mazurek et al. | ............ | 428/156 |
| 5,676,787 A | 10/1997 | Rusincovitch et al. | ...... | 156/277 |
| 5,731,073 A | 3/1998 | Knott et al. | ............ | 428/304.4 |
| 5,795,636 A | 8/1998 | Keller et al. | ............... | 428/40.1 |
| 5,853,862 A * | 12/1998 | Murai et al. | ................. | 428/215 |
| 5,866,220 A | 2/1999 | Rusincovitch et al. | ..... | 428/40.1 |
| 5,897,930 A | 4/1999 | Calhoun et al. | ............ | 428/41.8 |
| 5,906,883 A | 5/1999 | Blanc-Brude | ............... | 428/178 |
| 6,001,471 A | 12/1999 | Bries et al. | ................. | 428/343 |
| 6,083,616 A | 7/2000 | Dressler | ..................... | 428/323 |
| 6,123,890 A | 9/2000 | Mazurek et al. | ............ | 264/293 |
| 6,197,397 B1 | 3/2001 | Sher et al. | ................. | 428/42.3 |
| 6,565,697 B1 | 5/2003 | Maercklein | ................. | 156/289 |

FOREIGN PATENT DOCUMENTS

| | | |
|---|---|---|
| EP | 0 279 579 A1 | 8/1988 |
| EP | 0 429 269 A1 | 11/1990 |
| EP | 0 479 223 B1 | 1/1996 |
| GB | 1 511 060 | 5/1978 |
| GB | 1 541 311 | 2/1979 |
| JP | 53149259 | 12/1978 |
| JP | 5953787 | 3/1984 |
| JP | 5978285 | 5/1984 |
| JP | 061254334 | 11/1986 |
| JP | 03231981 | 10/1991 |
| JP | 5271629 | 5/1993 |
| JP | 06212131 | 8/1994 |
| JP | 09157612 | 6/1997 |
| WO | 98/29516 | 7/1998 |
| WO | 99/15600 | 4/1999 |
| WO | 99/35201 | 7/1999 |
| WO | 00/69985 | 11/2000 |

OTHER PUBLICATIONS

Concise Encyclopedia of Polymer Science and Engineering, pp. 902-903. Date and Publisher: 1990 by John Wiley & Sons, Inc.*

PCT/US01/12958; International Search Report mailed Sep. 4, 2001.

PCT/US01/12999; International Search Report mailed Jul. 31, 2001.

* cited by examiner

ADHESIVE ARTICLE WITH IMPROVED AIR EGRESS

This application claims the priority of Provisional application No. 60/199,244 filed Apr. 24, 2000.

TECHNICAL FIELD OF THE INVENTION

This invention relates to adhesive articles and methods of making the same. The adhesive articles may be used for graphic images, such as those used on vehicles.

BACKGROUND OF THE INVENTION

Pressure sensitive adhesives have enjoyed great acceptance for their convenience of use. The pressure sensitive adhesive is often used for tapes and articles containing graphic images. The advantages of the pressure sensitive adhesives are their strong bonding and simplicity of application. One drawback of these products is the initial tenacity of the pressure sensitive adhesive. The positioning of the product must be precise because of the initial strong bond of the adhesive. A need exists to make products using pressure sensitive adhesives which are repositionable, i.e. the product may be removed after light application of pressure without destroying the product or the substrate. Another need exists for the products to be able to slide. Slideability allows for correction of alignment of the product without the need of completely removing the product and possibly destroying the adhesive article or substrate.

When the product is a graphic image and is applied over an area like a wall or truck panel, there is the possibility of trapping air under the product and forming bubbles or wrinkles. The product must exhibit air egress, i.e. the ability of the product to provide a route for air trapped under the product to be removed.

A need exists for products which have one or more of the desirable properties of air egress, repositionability and slideability.

SUMMARY OF THE INVENTION

This invention relates to an adhesive article which provides air egress. Air egress is provided by supplying at least one route, such as areas of no initial adhesion for the air to flow out from under the construction. The invention relates to an adhesive article comprising a facestock having a front surface and a back surface, a continuous layer of adhesive having an upper surface and a lower surface, wherein the upper surface of the adhesive layer is adhered to the back surface of the facestock, and a pattern of non-adhesive material forms that are in embedded into the lower or upper surface of the adhesive layer. The invention further relates to methods of preparing the adhesive articles. These articles have usefulness as industrial graphics images, as well as decorative coverings, etc. The articles provide one or more of air egress, repositionability and slideability.

The method of making the adhesive articles of the present invention includes the steps of: (a) applying a pattern of a non-adhesive material onto an adhesive layer that has been coated onto a facestock; (b) embedding the non-adhesive material into the adhesive layer; and optionally, (c) applying a release liner to the adhesive layer. The embedding and applying steps may be combined.

Another embodiment of the method of making the adhesive articles of the present invention includes the steps of: (a) applying a pattern of a non-adhesive material onto an adhesive layer that has been coated onto a release liner; (b) embedding the non-adhesive material into the adhesive layer; and (c) applying a facestock or a second release layer to the adhesive layer. The embedding and applying steps may be combined.

DESCRIPTION OF THE PREFERRED EMBODIMENTS

Figure 1A:
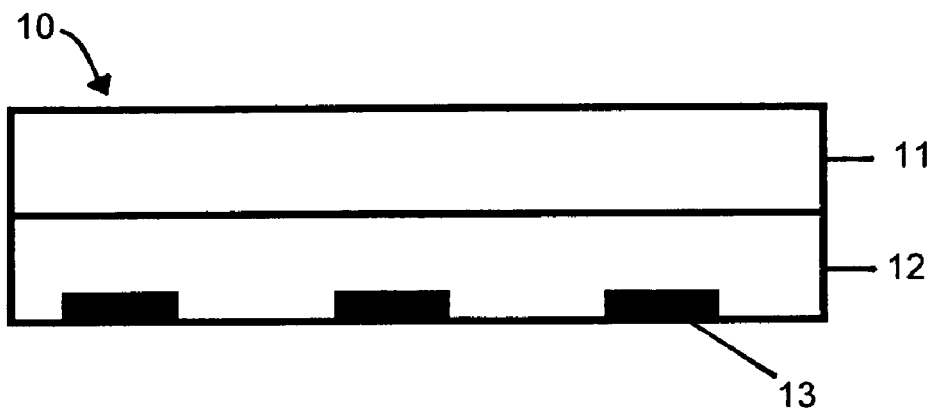
FIGS. 1a and 1b are cross sectional areas of an adhesive article with non-adhesive material embedded in the adhesive.

As described above, the present invention relates to adhesive articles such as those used for industrial graphics. The adhesive articles provide one or more of air egress, repositionability and slideability for easy application to a substrate.

The adhesive articles comprise a facestock, a continuous adhesive layer, and a non-adhesive material. The adhesive article may further comprise a release liner releasably adhered to the adhesive layer. In one embodiment, the non-adhesive material includes non-adhesive polymers, including ink compositions applied by printing methods. In another embodiment, the non-adhesive material is applied by vacuum metalization or by sputtering. The non-adhesive material, after drying, cooling, and/or curing, adheres to the upper or lower surface of the adhesive layer. In one embodiment, the non-adhesive composition contains greater than 50%, or greater than 75%, or greater than 85% solids. In another embodiment, the non-adhesive composition is 100% solids.

In one embodiment, the non-adhesive material can be any material that can be used as the ink on a printing machine, provided that upon drying, cooling, and/or curing, the non-adhesive material is not tacky. The non-adhesive material may be made of organic polymeric material such as polyurethane, polyvinyl chloride, acrylic polymers, acetate, polyethylene, polypropylene or polystyrene and the like.

In one embodiment, the non-adhesive composition is a UV curable ink. The ultraviolet radiation curable inks useful in the invention generally comprise a binder which comprises one or more photopolymerizable monomers. The photopolymerizable monomers generally are ethylenically unsaturated compounds. The unsaturated compounds may contain one or more olefinic double bonds, and they may be low molecular weight compounds, (monomeric) or high molecular weight compounds (oligomeric). Illustrative examples of monomers containing one double bond are acrylates such as alkyl(meth)acrylates or hydroxyalkyl (meth)acrylates such as methyl-, ethyl-, butyl-, 2-ethylhexyl- or 2-hydroxyethylacrylate, isobornylacrylate, methyl- or ethylmethacrylate. Further examples of photopolymerizable monomers are acrylonitrile, acrylamide, methacrylamide, N-substituted (meth) acrylamides, vinyl esters such as vinyl acetate, vinyl ethers such as isobutylvinyl ether, styrene, alkylstyrenes and halostyrenes, N-vinylpyrrolidone, vinyl chloride or vinylidene chloride.

Monomers containing a plurality of double bonds are typically the diacrylates of ethylene glycol, 1,3-propylene glycol, 1,4-butaneodiol, 1,4-cyclohexane diol, neopentyl glycol, hexamethylene glycol, or bisphenol A polyacrylates such as trimethylolpropane triacrylate and pentaerythritol triacrylate or tetraacrylate, vinyl acrylate, divinyl benzene, divinyl succinate, diallyl phthalate, triallylphosphate, triallylisocyanurate or tris(2-acryloyloxy)ethyl-isocyanurate.

Typical examples of high molecular weight (oligomeric) polyunsaturated compounds are acrylated epoxy resins, acrylated polyethers, acrylated polyurethanes or acrylated polyesters. Further examples of unsaturated oligomers are unsaturated polyester resins which are normally prepared from maleic acid, phthalic acid and one or more diols and which have molecular weights of about 500 to about 3000. Such unsaturated oligomers may also be referred to as prepolymers. Single component systems based on photocurable prepolymers are often used as binders for printing inks. Unsaturated polyester resins are normally used in two-component systems together with a monounsaturated monomer such as described above, preferably with styrene.

The unsaturated compounds also can be used in admixture with non-photopolymerisable film-forming components. These components may typically be drying polymers or their solutions in organic solvents, such as nitrocellulose. They may also, however, be chemically curable or thermocurable resins such as polyisocyanates, polyepoxides or melamine resins. The concomitant use of thermocurable resins is important for use in so-called hybrid systems which are photopolymerised in a first step and crosslinked by a thermal after treatment in a second step.

The UV radiation curable inks also should contain at least one photoinitiator. A wide range of different photoinitiators is at present available for UV radiation curable systems. They include benzophenone and benzophenone derivatives, benzoin ethers, benzil ketals, dialkoxyacetophenones, hydroxyacetophenones, aminoacetophenones, haloacetophenones or acryloxyphosphine oxides. They differ in that they have different absorption maxima. To cover a wide absorption range it is possible to use a mixture of two or more photoinitiators. The total amount of photoinitiator in the UV radiation curable compositions may be in the range of from about 0.05 to about 7, or 10% by weight of the total composition. Preferably the compositions contain from about 0.2% to about 5% by weight of the photoinitiator.

Amines may be added to accelerate the photopolymerisation, for example triethanolamine, N-methyl-diethanolamine, p-dimethylaminobenzoate or Michler's ketone. The photopolymerisation can further be accelerated by the addition of photosensitisers which displace or broaden the spectral sensitivity. These photosensitisers are preferably aromatic carbonyl compounds such as thioxanthone, anthraquinone and 3-acyl-coumarin derivatives as well as 3-(aroylmethylene)-thiazolines.

Hindered amine light stabilizers (HALS) which function as co-stabilizers, also may be added to the UV radiation curable printing compositions used in the present invention. Examples of hindered amine light stabilizers include those listed and recited in U.S. Pat. Nos. 5,112,890 and 4,636,408, which are incorporated herein by reference. A specific example of a hinder amine light stabilizer useful in the printing inks is Tinuvin 292 which is identified as bis(1,2,2,6,6-pentamethyl-4-piperidinyl) sebacate.

In addition to the above described binder materials and photoinitiators, the UV radiation curable inks used in the present invention may also contain coloring matter selected from organic pigments, inorganic pigments, body pigments and dyes which are known and have been used in this art. Examples of useful pigments include titanium dioxide, cadmium yellow, cadmium red, cadmium maroon, black iron oxide, carbon black, chrome green, gold, silver, aluminum and copper. Examples of dyes include alizarine red, Prussian blue, auramin naphthol, malachite green, etc. Generally the concentration of the pigment or dye in the ink will be from about 0 to about 70% by weight, and in one embodiment, from about 0.1% to about 50% by weight.

In addition to the above described coloring matter, the UV radiation curable inks used in the present invention may also contain fillers, extenders, surfactants, and the like which are known and have been used in this art. Examples of useful fillers and extenders include silicon dioxide, fumed silica, glass or ceramic microspheres, and glass or ceramic bubbles. Generally the concentration of the filler or extender will be from about 0 to about 70% by weight, and in one embodiment, from about 0.5% to about 50% by weight.

The printing inks may also contain at least one UV absorber which provides weathering protection and helps prevent microcracking. The amount of UV absorber included in the UV radiation curable ink should be maintained at a practical minimum since the presence of the UV absorber may increase the curing rate. A variety of UV absorbers are known and useful in the present invention and these include UV absorbers belonging to the group of photopolymerisable hydroxybenzophenones and photopolymerisable benzotriazoles. U.S. Pat. No. 5,369,140 describes a class of 2-hydroxyphenyl-s-triazines that are useful as UV absorbers for radiation curable systems. The triazines are effective for stabilizing cured films when exposed to sunlight over a long period of time, and these stabilizers do not interfere with UV radiation curing of the inks. The triazine UV absorbers are effective in amounts of from about 0.1 to about 2% by weight. The UV absorbers may be used in combination with other light stabilizers such as sterically hindered amines. The disclosure of the '140 patent is hereby incorporated by reference for its disclosure of such UV absorber combinations. U.S. Pat. Nos. 5,559,163 and 5,162,390 also describe UV absorbers which are useful in the inks of the present invention.

Examples of useful UV curable inks include those available from Decochem under the trade designation Poly-Rad plastics, as well as UV curable inks commercially available from Acheson and Daw Chemical Company.

In one embodiment of the invention, the ink used to form the non-adhesive material on the adhesive layer is a coalescing ink. The ink does not efficiently wet out on the surface of the adhesive, but coalesces into smaller areas of ink with an increase in height. Thus, depending on the degree of coalescence, a line of printed ink can form a narrower line, or a line made up of what appear to be random small beads of ink, or a combination, all with an increase in height. The narrower line, small beads, or combination are then embedded into the adhesive. The thickness of the ink applied to the surface of the adhesive layer can also affect the degree of coalescence. Surfactants may be added to the ink composition to control the degree of coalescence as well.

In one embodiment of the invention, the ink used to form the non-adhesive material comprises a porous non-adhesive. The porous non-adhesive may have elastomeric properties, so that if it is compressed, it essentially returns to its original shape. For example the porous non-adhesive comprises an ink containing a blowing agent that causes the ink to expand, forming an open or closed cell, or combination thereof. The blowing agent is activated, for example, by the application of heat to the ink. Other examples of porous non-adhesives include suspensions of gas and/or particles in a binder. The porous non-adhesive is then embedded into the adhesive layer. The porous non-adhesive fills the depression created in the embedding step, resulting in a facestock layer having a smooth outer appearance.

The non-adhesive material is generally present in a pattern. The pattern can be a plurality of dots, lines, or any geometric figure, that provides a path for air egress from the adhesive article. When lines are used, at least about 50% of the pattern should extend to the edge of the adhesive article to obtain acceptable air egress. The lines and dots may vary in size provided that air egress is maintained. The lines and other patterns generally have an average thickness from about 0.3μ to about 100μ, or from about 0.5μ to about 50μ, or from about 2μ to about 20μ. The width of the lines may also vary widely. An example of a useful range for line width is from about 12μ to about 250μ, or from about 25μ to about 125μ about 50μ to about 75μ. The pattern may be a grid of intersecting lines, a weave pattern, a waffle pattern, diagonal straight and curves lines, tiled geometric figures, such as hexagons, rectangles, overlapping circles or triangles, or lines in a cross hatch pattern. Combinations of patterns may be used such as a grid of intersecting lines with random or patterned dots. The non-adhesive material may be applied by any means.

In one embodiment, the non-adhesive material is an ink comprising a UV curable polymer composition, such as a UV curable acrylic or polyurethane composition. After application, the ink is cured by irradiation in a UV exposure apparatus as is well known to those skilled in the art of printing and UV curing. UV light sources such as low pressure mercury lamps, high pressure mercury lamps, xenon lamps, arc lamps and gallium lamps are useful. It is also possible, but not necessary, to improve the curability of the ink by heating after irradiation.

In one embodiment, the non-adhesive material is a polymer composition which is able to be printed by any suitable printing technique such as screen printing, roller coat printing, flexographic printing, lithographic printing, gravure printing, laser printing, ink jet printing, brushing, spraying, dipping or coating. The type of printing may be any type which can print on the pressure sensitive adhesive. One particularly useful printing method is a modification of flexographic printing which provides both the printing and embedding of the non-adhesive material.

In one embodiment, the non-adhesive layer is a printing ink having a thickness from about 0.3 to about 100 microns, from about 0.5 to about 50 microns, or from about 2 to about 20 microns. The non-adhesive material may also be applied to the pressure sensitive adhesive by means of patterned vacuum metallization or sputtering. In this embodiment, the non-adhesive layer typically has a thickness from about 30 to about 3000, from about 100 to about 2000, or from about 300 to about 1500 nanometers.

As described above, the adhesive article has a facestock, an adhesive layer, a plurality of non-adhesive material and optionally the construction has a release liner. The facestock may be any of those which are useful for decorative or graphic image applications. The facestocks typically have a thickness from about 10 to about 300, or from about 25 to about 125 microns. The facestocks include paper, polyolefins (linear or branched), polyamides, polystyrenes, nylon, polyesters, polyester copolymers, polyurethanes, polysulfones, polyvinylchloride, styrene-maleic anhydride copolymers, styrene-acrylonitrile copolymers, ionomers based on sodium or zinc salts of ethylene methacrylic acid, polymethyl methacrylates, cellulosics, fluoroplastics, acrylic polymers and copolymers, polycarbonates, polyacrylonitriles, and ethylene-vinyl acetate copolymers. Included in this group are acrylates such as ethylene methacrylic acid, ethylene methyl acrylate, ethylene acrylic acid and ethylene ethyl acrylate. Also, included in this group are polymers and copolymers of olefin monomers having, for example, 2 to about 12 carbon atoms, and in one embodiment 2 to about 8 carbon atoms. These include the polymers of alpha-olefins having from 2 to about 4 carbon atoms per molecule. These include polyethylene, polypropylene, poly-1-butene, etc. An example of a copolymer within the above definition is a copolymer of ethylene with 1-butene having from about 1 to about 10 weight percent of the 1-butene comonomer incorporated into the copolymer molecule. The polyethylenes that are useful have various densities including low, medium and high density ranges. The low density range is from about 0.910 to about 0.925 g/cm$^3$; the medium density range is from about 0.925 to about 0.940 g/cm$^3$; and the high density range is from about 0.94 to about 0.965 g/cm$^3$. Films prepared from blends of copolymers or blends of copolymers with homopolymers also are useful. The films may be extruded as a monolayer film or a multi-layered film.

In one embodiment, the first facestock is a polymeric facestock, which contains migratory additives. The facestocks are preferably polyvinylchloride facestocks. The additives include plasticizers and antioxidants. The plasticizer is a high-boiling solvent or softening agent, usually liquid. It is an ester made from an anhydride or acid and a suitable alcohol that usually has between 6 to 13 carbon atoms. The plasticizers may be adipate, phosphate, benzoate or phthalate esters, polyalkylene oxides, sulfonamides, etc. The plasticizers include but are not limited to DOA plasticizer (dioctyl adipate), TEG-EH plasticizer (triethylene glycol di-2-ethylhexanoate), TOTM plasticizer (trioctyl trimellitate), triacetin plasticizer (glyceryl triacetate), TXIB plasticizer (2,2,4-trimethyl-1,3-pentanediol diisobutyrate), DEP plasticizer (diethyl phthalate), DOTP plasticizer (dioctyl terephthalate), DMP plasticizer (dimethyl phthalate), DOP plasticizer (dioctyl phthalate), DBP plasticizer (dibutyl phthalate), polyethylene oxide, toluenesulfonamide, dipropylene glycol benzoate, and the like.

The adhesive articles have a continuous adhesive layer, typically a pressure sensitive adhesive layer. In some applications, the adhesive may be a heat activated adhesive, as distinguished from a pressure sensitive adhesive. The adhesive layer typically has a thickness from about 10 to about 125, or from about 25 to about 75, or from about 10 to about 50 microns. In one embodiment, the coat weight of the pressure sensitive adhesive is in the range of about 10 to about 50 grams per square meter (gsm), and in one embodiment about 20 to about 35 gsm. The pressure-sensitive adhesive can be any pressure sensitive adhesive known in the art. These include rubber based adhesives, acrylic adhesives, vinyl ether adhesives, silicone adhesives, and mixtures of two or more thereof. Included are the pressure sensitive adhesive materials described in "Adhesion and Bonding", *Encyclopedia of Polymer Science and Engineering*, Vol. 1, pages 476–546, Interscience Publishers, 2nd Ed. 1985, the disclosure of which is hereby incorporated by reference. The pressure sensitive adhesive materials that are useful may contain as a major constituent an adhesive polymer such as acrylic type polymers, block copolymers, natural, reclaimed or styrene butadiene rubbers, tackified natural or synthetic rubbers, random copolymers of ethylene and vinyl acetate, ethylene-vinyl-acrylic terpolymers, polyisobutylene, poly(vinyl ether), etc. The pressure sensitive adhesive materials are typically characterized by glass transition temperatures in the range of about −70° C. to about 10° C.

Other materials in addition to the foregoing resins may be included in the pressure sensitive adhesive materials. These include solid tackifying resins, liquid tackifiers (often referred to as plasticizers), antioxidants, fillers, pigments, waxes, etc. The adhesive materials may contain a blend of solid tackifying resins and liquid tackifying resins (or liquid plasticizers). Particularly useful adhesives are described in U.S. Pat. Nos. 5,192,612 and 5,346,766 which are incorporated herein by reference.

The pressure sensitive adhesive can be applied using standard coating techniques, such as curtain coating, gravure coating, reverse gravure coating, offset gravure coating, roller coating, brushing, knife-over roll coating, air knife coating metering rod coating, reverse roll coating, doctor knife coating, dipping, die coating, spraying, and the like. The application of these coating techniques is well known in the industry and can effectively be implemented by one skilled in the art. The knowledge and expertise of the manufacturing facility applying the coating determine the preferred method. Further information on coating methods can be found in "Modern Coating and Drying Technology", by Edward Cohen and Edgar Gutoff, VCH Publishers, Inc., 1992.

Release liners for use in the present invention may be those known in the art. In general, useful release liners include polyethylene coated papers with a commercial silicone release coating, polyethylene coated polyethylene terephthalate films with a commercial silicone release coating, or cast polypropylene films that can be embossed with a pattern or patterns while making such films, and thereafter coated with a commercial silicone release coating. A preferred release liner is kraft paper which has a coating of low density polyethylene on the front side with a silicone release coating and a coating of high density polyethylene on the back side. Other release liners known in the art are also suitable as long as they are selected for their release characteristics relative to the pressure sensitive adhesive chosen for use in the present invention. In one embodiment of the invention, the release liner has a moldable layer of polymer under the release coating. The moldable layer is typically a polyolefin, such as polyethylene or polypropylene. The surface of the release layer of the release liner may have a textured finish, a smooth finish, or a patterned finish. The release layer may have a randomly microstructured surface such as a matte finish, or have a pattern of three-dimensional microstructures. The microstructures may have a cross-section which is made up of circles, ovals, diamonds, squares, rectangles, triangles, polygons, lines or irregular shapes, when the cross-section is taken parallel to the surface of the release surface.

In one embodiment, the release liner has a release coating on both sides; one side having a release coating of a higher release value than the release coating of the other side.

In one embodiment, the adhesive layer of the articles has a Sheffield roughness of at least about 10 or at least about 75, or at least about 150. The adhesive layer may itself have the roughness or may be formed when the adhesive is coated onto a release liner. It is understood that the release liner may have a Sheffield roughness at least about 10 or at least about 50, or at least about 75 or at least about 150. The adhesive will replicate the complementary texture or pattern of the release liner. Alternatively, the release liner can be much rougher depending on the configuration of the adhesive article. The Sheffield roughness is determined by TAPPI T 538 om-88.

Applicant has discovered that the addition of the non-adhesive material either on or in the adhesive layer provides improved air egress. The non-adhesive may be embedded so that its outer surface is even with the plane of the adhesive surface. Alternatively, the non-adhesive may be embedded so that its outer surface extends beyond the plane of the adhesive surface, or embedded so that its outer surface is below the plane of the adhesive surface (i.e., within the adhesive layer). When the non-adhesive material is embedded to a level even with the plane of the adhesive layer, the non-adhesive material provides air egress along the interface. This is particularly true for the smaller bubbles which form as the natural result of laying the adhesive construction onto a substrate. Even when applied properly, small bubbles are still formed. The air in these bubbles needs a route to egress. The interface of the non-adhesive material and the substrate is the area where this occurs. When the non-adhesive material extends beyond the adhesive layer, the non-adhesive material provides repositionability and/or slideability as well as air egress. This is of particular advantage when applying adhesive articles to surfaces that are above room temperature. The amount of the non-adhesive material extending below the adhesive layer needs to be only sufficient to prevent contact of the adhesive layer with the substrate.

The invention is further described by referring to the Figures. Referring to FIG. 1a, article 10 has facestock 11 in adhesive contact with adhesive layer 12. Adhesive layer 12 has embedded within it non-adhesive material 13. Embedding may be carried out using pressure and/or heated rollers or a platen, whereby the non-adhesive material is pressed into the adhesive layer. Alternatively, the non-adhesive material is embedded into the adhesive layer by winding the article so that the patterned lower surface of the adhesive is in contact with the front (upper) surface of the facestock. The facestock may have a release coating on its front surface. It is understood that at least a major amount of the non-adhesive material is embedded within adhesive layer 12. Typically more that 75%, and more than 85% of the thickness of the non-adhesive material 13 is embedded in the adhesive layer 12.

Figure 1B:
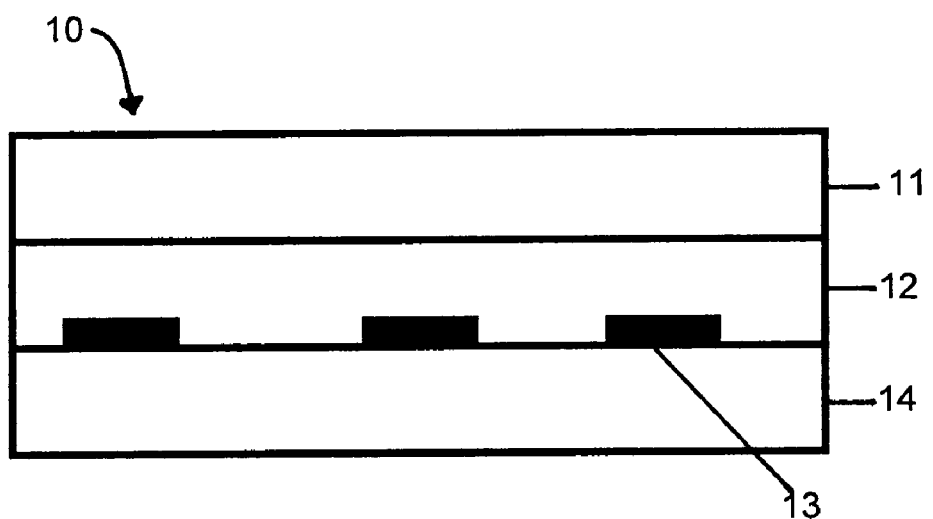

In referring to FIG. 1b, the adhesive article 10 has the additional element of a release liner 14. The release liner 14 is in releasable adhesive contact with adhesive layer 12 and contacts non-adhesive material 13. The adhesive layer 12 is also in adhesive contact with facestock 11. Embedding the non-adhesive material into the adhesive layer may be carried out by applying the release liner to the adhesive layer. The pressure used in applying the release liner embeds the non-adhesive into the adhesive layer.

In another embodiment, the adhesive article comprises a first release liner in adhesive contact with an adhesive layer. The adhesive layer has embedded into its exposed surface a pattern of non-adhesive material. A second release liner is applied to the patterned exposed adhesive surface. The surface of the second release liner in contact with the adhesive layer may be textured. The texture may be a random texture or a patterned texture.

Figure 2A:
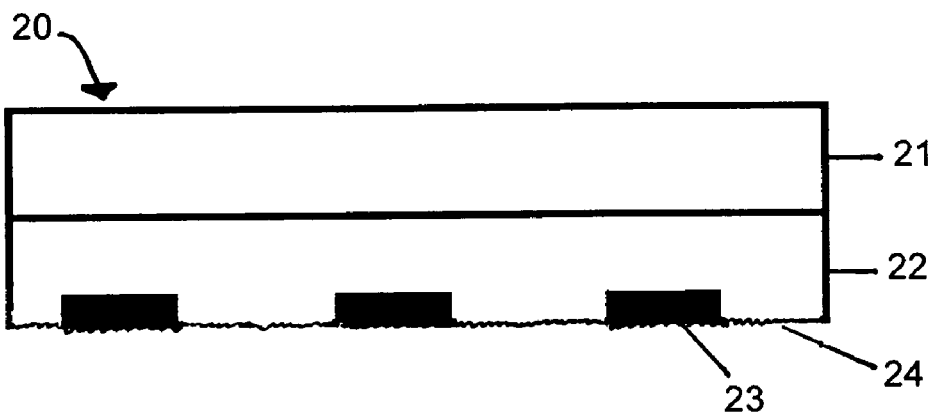
FIGS. 2a and 2b are cross sectional areas of an adhesive article with non-adhesive material embedded and with a textured finish, such as a matte finish.
Figure 2B:
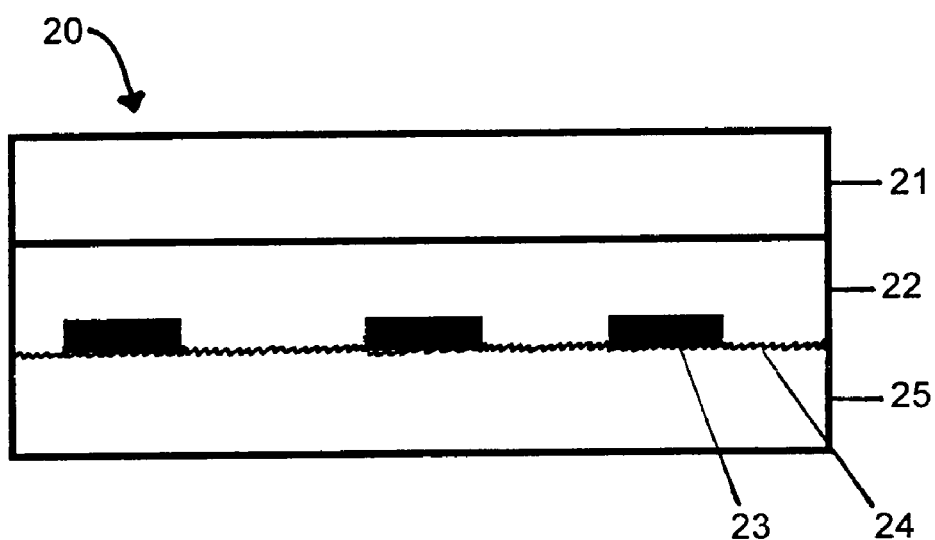

Referring to FIG. 2a, article 20 has facestock 21, which is in adhesive contact with adhesive layer 22. Adhesive layer 22 is in adhesive contact with non-adhesive material 23 embedded in adhesive layer 22. Adhesive layer 22 has a textured surface 24. In FIG. 2b, the article has the additional element of a release liner 25. The release liner 25 is in adhesive contact with adhesive layer 22 and in contact with the non-adhesive material 23 embedded in adhesive layer 22. It should be noted that the release liner in the present invention may be textured. The textured surface of the adhesive layer may be produced during the embedding step. Alternatively, the texture in the release liner may be transferred to the adhesive layer during the adhesive coating process. Commercially available textured liners may be used.

Figure 3A:
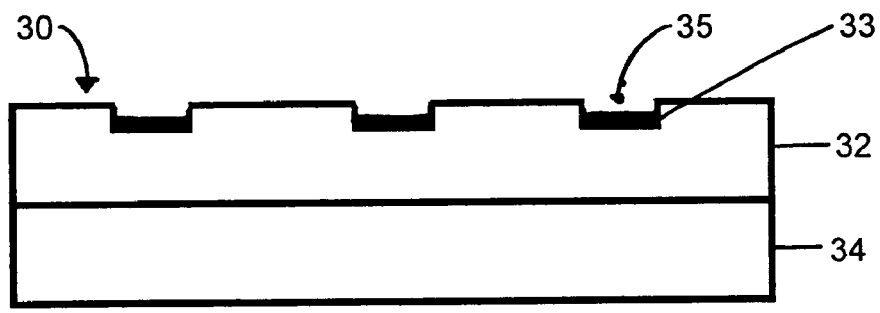
FIGS. 3a, b and c are cross sectional areas of an adhesive article with a non-adhesive material embedded in the adhesive layer at the interface between the adhesive and the facestock.
Figure 3B:
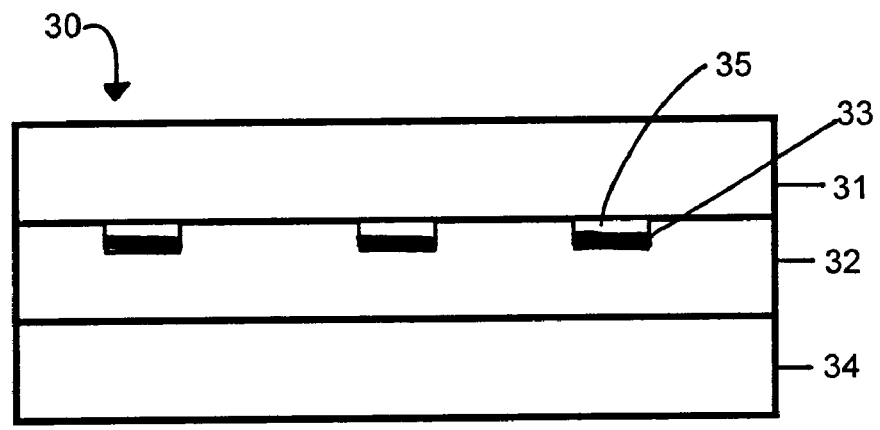
Figure 3C:
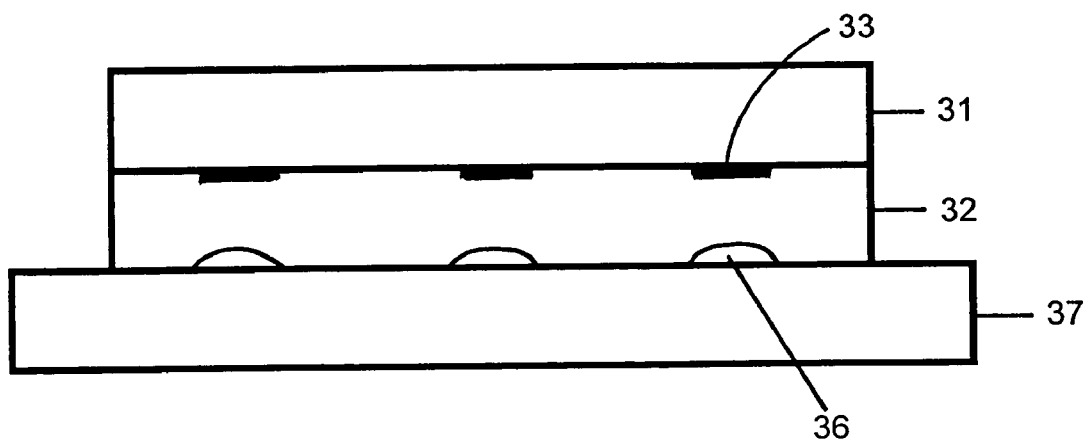

In another embodiment, illustrated in FIG. 3a, an adhesive article 30 having improved air egress is provided by simultaneously printing and embedding a pattern of non-adhesive areas 33 into the surface of an adhesive 32 on a release liner 34. Using flexographic printing techniques, a pattern, such as diamonds, is printed into the exposed surface of an adhesive 32 on a release liner 34. The non-adhesive material 33 is a non-adhesive resin which upon drying, cooling, and/or curing maintains its shape. The printing technique embeds the print into the soft surface of the adhesive 32, leaving channels 35 with most of the printing compound on the bottom of the channels. Thus, the top surface of the printing compound 33 is below the plane of the upper surface of the adhesive layer 32. The non-adhesive material 33 is chosen from those materials that prevent the adhesive from flowing back into the channels 35 created by the printing process. Examples of such non-adhesive materials include hard PMMA, or a two component urethane. Referring to FIG. 3b, the printed adhesive 32 with channels 35 is transferred by lamination to a facestock 31, maintaining the channels in the adhesive. Upon removal of the release liner 34 and application of the exposed adhesive to the surface of substrate 37 using pressure the channels 35 collapse or partially collapse, forming voids 36 at the interface between the adhesive 32 and the substrate 37, allowing trapped air to move to the exposed edges, as illustrated in FIG. 3c.

In one embodiment of the present invention, the adhesive article is prepared by applying a non-adhesive material to the adhesive surface of an adhesive article. The non-adhesive material may be fully or partially embedded into the adhesive surface. Embedding may be carried out using pressure and/or heated rollers or a platen, whereby the non-adhesive material is pressed into the adhesive surface. The roller may be a silicone rubber roller. Embedding into the adhesive typically occurs at a temperature from about 65° to about 200° F., or from about 100° to about 150° F. The embedding pressure for embedding into the adhesive is typically between about 15 to about 100 psi, or from about 25 to about 50 psi. Alternatively, the non-adhesive material may be embedded into the adhesive layer by applying with pressure another layer, such as a release liner or facestock layer onto the non-adhesive patterned surface of the adhesive layer. The non-adhesive material may also be embedded into the adhesive layer by winding up the adhesive layer coated onto a facestock or release liner so that the non-adhesive material is embedded into the adhesive layer when the exposed surface of the adhesive contacts the outer surface of the facestock or release liner. The non-adhesive material will generally be embedded at a level of at least about 50%, or at least about 75%, or at least about 85% of the thickness of the non-adhesive material, or embedded to a level equal to the surface of the embedding media.

Figure 4A:
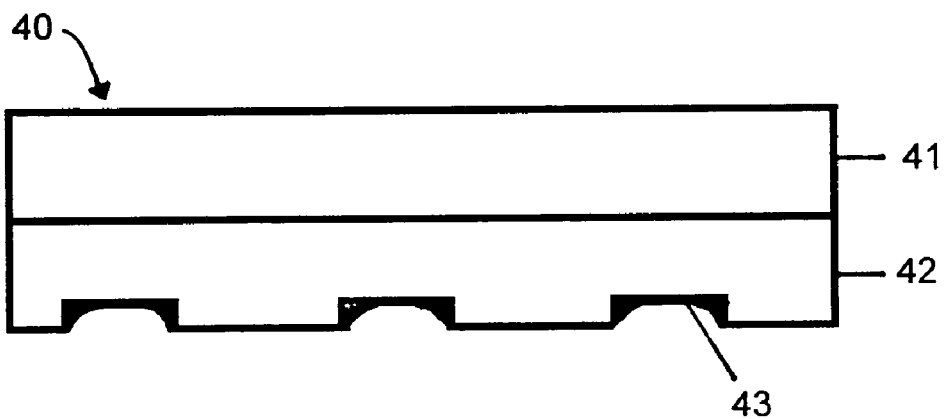
FIGS. 4a and 4b are cross sectional areas of an adhesive article with non-adhesive material in channels within the adhesive layer.
Figure 4B:
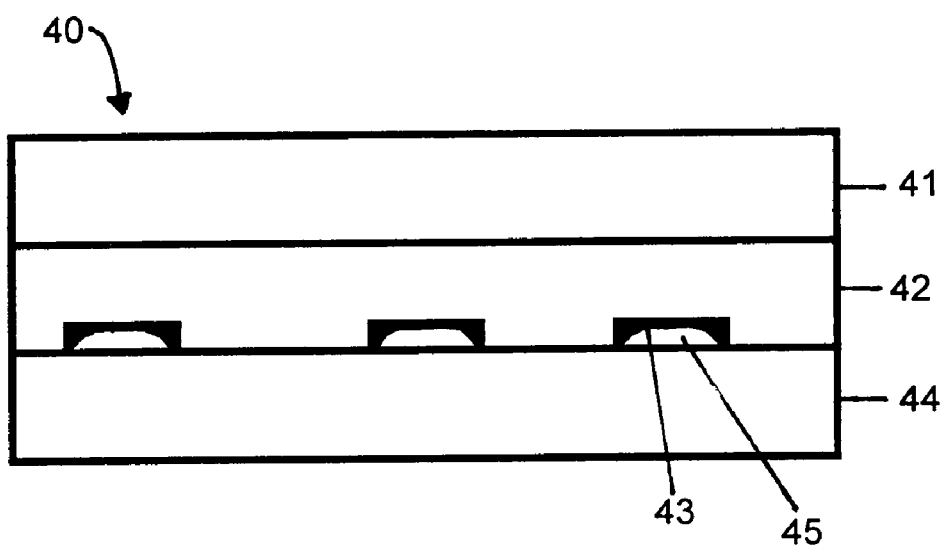

In another embodiment of the present invention illustrated in FIGS. 4a–b, an adhesive article having improved air egress is provided by simultaneously printing and embedding a pattern of non-adhesive areas into the surface of an adhesive on a facestock. The non-adhesive areas may be printed and embedded by flexographic printing techniques. The facestock may be, for example, cast or extruded vinyl. The non-adhesive material is a non-adhesive resin which upon drying, cooling, and/or curing maintains its shape. Referring to FIG. 4a, an article having improved air egress is provided by simultaneously printing and embedding a pattern of non-adhesive areas 43 into the surface of an adhesive 42 on a facestock 41. The printing technique embeds the print into the soft surface of the adhesive 42, leaving channels 45 with most of the printing compound on the bottom of the channels. The non-adhesive material is chosen from those materials that prevent the adhesive from flowing back into the channels created by the printing process. Examples of such non-adhesive materials include hard PMMA, or a two component urethane. Referring to FIG. 4b, a release liner 44 is laminated to the exposed printed surface of the adhesive 42, maintaining the channel 45 in the adhesive 42. Upon removal of the release liner 44 and application of the exposed adhesive to a surface using pressure, the channel 45 collapses or partially collapses, allowing trapped air to move to the exposed edges.

Figure 5A:
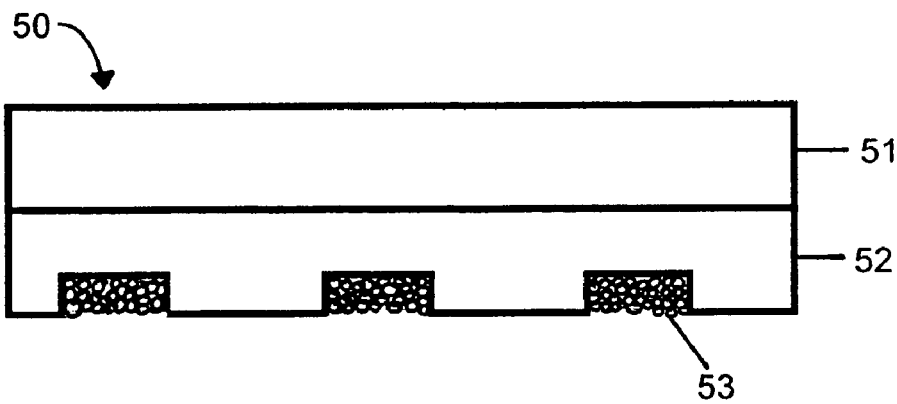
FIGS. 5a and 5b are cross sectional areas of an adhesive article with a porous non-adhesive material embedded in the adhesive layer at the interface between the adhesive and the release liner.
Figure 5B:
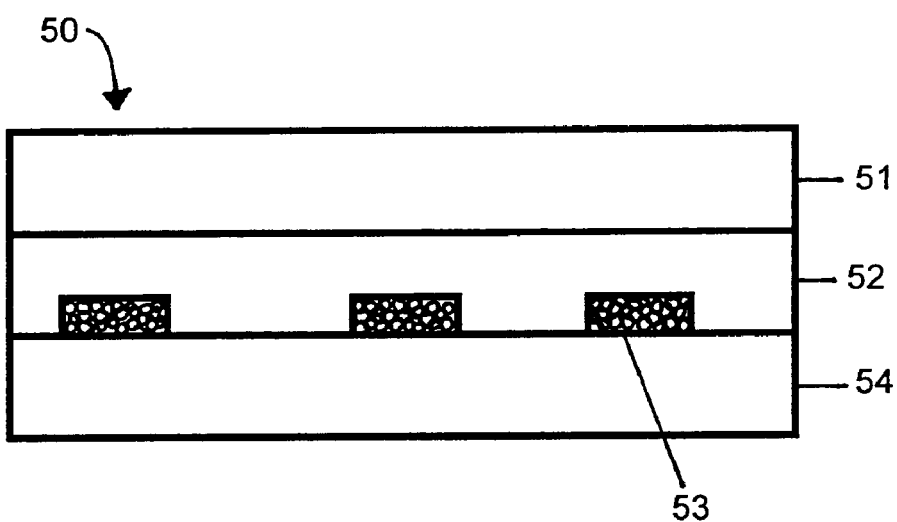

FIGS. 5a–b illustrate another embodiment. An adhesive article having improved air egress characteristics as well as improved facestock smoothness is provided by simultaneously printing and embedding a pattern of non-adhesive material into an adhesive on a facestock. The non-adhesive material pattern may be printed and embedded by using flexographic printing techniques. The non-adhesive material is subsequently foamed to form a porous non-adhesive. The porous non-adhesive partially, completely, or overly fills the channels in the adhesive. Referring to FIG. 5a, a pattern of non-adhesive material 53 is printed into the exposed surface of an adhesive 52 on a facestock 51. The printing technique presses the non-adhesive material into the soft surface of the adhesive, leaving a pattern with most of the non-adhesive material on the bottom of the channel. The non-adhesive material 53 is comprised of a resin which upon drying, cooling, and/or curing is foamed to partially, completely, or overly fill the channel forming a porous non-adhesive. Referring to FIG. 5b, the adhesive with the porous non-adhesive channels is transferred by lamination to a release liner 54. Upon removal of the release liner and application of the exposed adhesive to a substrate surface with pressure, the porous non-adhesive in the channel collapses slightly, allowing trapped air to move to the exposed edges. Removal of the application pressure allows the porous non-adhesive to return to its original uncompressed shape, removing texture from the surface of the facestock.

Figure 6A:
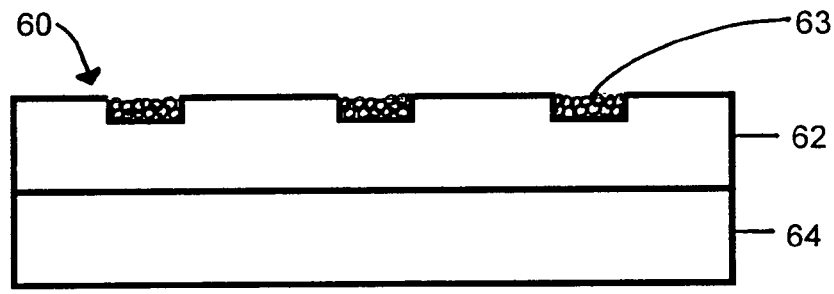
FIGS. 6a, b and c are cross sectional areas of an adhesive article with a porous non-adhesive material embedded in the adhesive layer at the interface between the adhesive and the facestock.
Figure 6B:
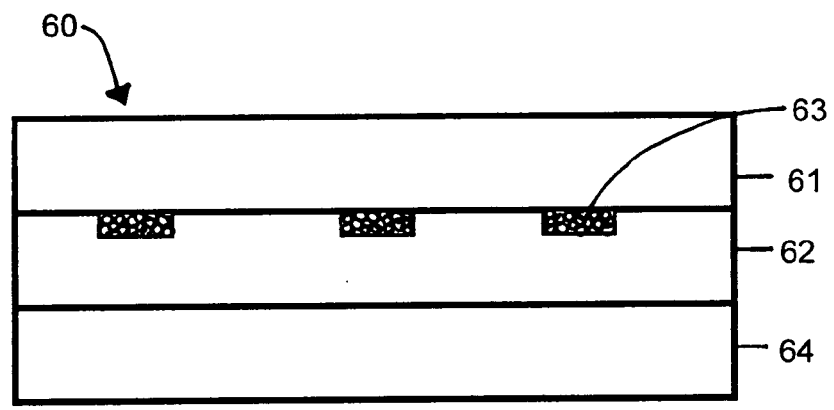
Figure 6C:
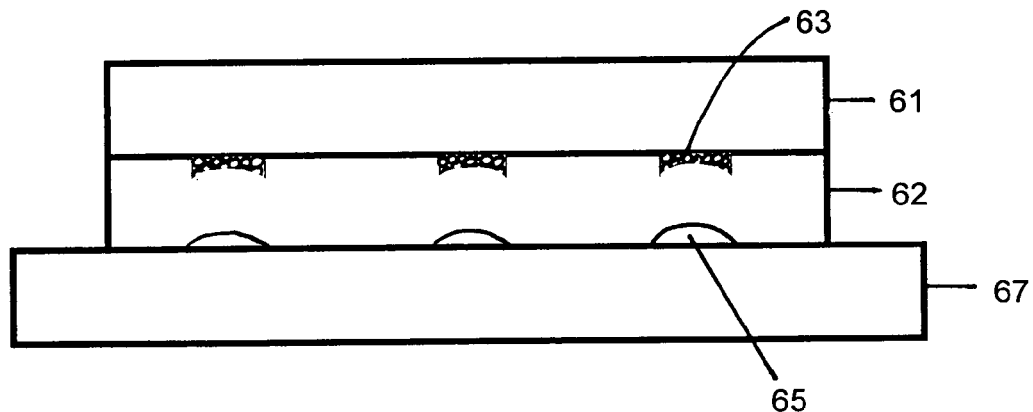

FIGS. 6a–c illustrate another embodiment. An adhesive article having improved air egress, characteristics as well as improved facestock smoothness is provided by simultaneously printing and embedding a pattern of non-adhesive material into an adhesive on a release liner. The non-adhesive material pattern may be printed and embedded by using flexographic printing techniques. The non-adhesive material is subsequently foamed to form a porous non-adhesive. The porous non-adhesive partially, completely, or overly fills the channels in the adhesive. Referring to FIG. 6a, a pattern of non-adhesive material 63 is printed into the exposed surface of an adhesive 62 on a release liner 64. The printing technique presses the non-adhesive material 63 into the soft surface of the adhesive 62, leaving a pattern with most of the non-adhesive material 63 on the bottom of the channel. The non-adhesive material 63 is comprised of a resin which upon drying, cooling, and/or curing is foamed to partially or completely fill the channel. Referring to FIG. 6b, the printed adhesive with the porous non-adhesive channels is transferred by lamination to a facestock 61. Referring to FIG. 6c, upon removal of the release liner 64 and application of the exposed adhesive 62 to a substrate surface 67 with pressure, the porous non-adhesive 63 in the channel collapses slightly, forming voids 65 at the interface between the adhesive 62 and the substrate 67, allowing trapped air to move to the exposed edges. Removal of the application pressure allows the foamed print to return to its original uncompressed shape, removing texture from the surface of the facestock 61.

In another embodiment, a random pattern of non-adhesive particulates, such as for example, glass beads, can be applied to the surface of the adhesive layer and then partially or fully embedded into the adhesive layer. The non-adhesive particulate, in addition to glass, may be made of organic and inorganic particles, including but not limited to polymers, ceramics and metals. The non-adhesive particulate may be spherical, cubic, irregularly shaped, solid, porous, hollow, elastic or inelastic. Alternatively, the randomly distributed non-adhesive particulate material may be applied to and then partially or fully embedded into the release liner.

In another embodiment, non-adhesive material is applied to and embedded into the upper surface of the adhesive layer. The release liner also has a pattern of non-adhesive material printed thereon. The printed non-adhesive material may be embedded into the surface of the release liner prior to applying the adhesive onto the release liner. Upon removal of the release liner from the adhesive, the non-adhesive material is transferred to the adhesive layer.

In yet another embodiment, non-adhesive material is applied to and embedded into the upper or lower surface of the adhesive layer. The release liner has randomly distributed non-adhesive particulate material applied to its release surface. The particulate non-adhesive material may be embedded into the surface of the release liner prior to applying the adhesive onto the release liner. Upon removal of the release liner from the adhesive, the non-adhesive material is transferred to the adhesive layer.

Another embodiment of the method of making the adhesive articles of the present invention includes the steps of: (a) applying a pattern of a non-adhesive material onto an adhesive layer that has been coated onto a release liner; (b) embedding the non-adhesive material into the adhesive layer; and (c) applying an additional release liner with a higher or lower release to the adhesive layer. The embedding and applying steps may be combined. The additional release liner may be omitted if the initial release liner has a release means on both surfaces. These embodiment are commonly known as transfer adhesives or adhesive sandwiches.

Another embodiment of the method of making the adhesive articles of the present invention includes the steps of: (a) applying a pattern of a non-adhesive material onto an adhesive layer that has been coated onto the back surface of a facestock; (b) embedding the non-adhesive material into the adhesive layer; and (c) winding the material so that the adhesive is in adhesive contact with the front surface of the facestock. The embedding and applying steps may be combined. A release means may optionally be added to the front surface of the facestock. This embodiment is commonly known as a linerless adhesive tape.

Another embodiment of the method of making the adhesive articles of the present invention includes the steps of: (a) applying a pattern of a non-adhesive material onto each of the outer surfaces of two adhesive layers that have been coated onto the front and back surfaces of a facestock; (b) embedding the non-adhesive material into the adhesive layers; and (c) applying a release liner with a release surfaces on each of its two sides to the outer surface of one of the adhesive layers and winding the material so that the outer surface of the second adhesive layer is in adhesive contact with the second surface of the release liner. The embedding and applying steps may be combined. This embodiment is commonly known as a double faced adhesive tape.

While the invention has been explained in relation to its preferred embodiments, it is to be understood that various modifications thereof will become apparent to those skilled in the art upon reading the specification. The features of the various embodiments of the adhesive articles described herein may be combined into within an adhesive article. The various methods of manufacturing the adhesive articles of the present invention described herein may also be combined. Therefore, it is to be understood that the invention disclosed herein is intended to cover such modifications as fall within the scope of the appended claims.

The invention claimed is:

1. An pressure sensitive adhesive article comprising:
   a facestock having a front surface and a back surface;
   a continuous layer of pressure sensitive adhesive having an upper surface and a lower surface and end edges, wherein the upper surface of the adhesive is adhered to the back surface of the facestock; and
   a pattern of non-adhesive material forms embedded into the lower surface of the adhesive layer, each of said non-adhesive material forms having a bottom surface, wherein the bottom surfaces of the non-adhesive material forms are above the plane of the lower surface of the adhesive layer, and wherein the pattern of non-adhesive material forms provides a path for air egress.

2. The adhesive article of claim 1 wherein the non-adhesive material forms have an average thickness of about 0.3μ to about 100μ.

3. The adhesive article of claim 1 wherein the non-adhesive material comprises a UV curable ink.

4. The adhesive article of claim 1 wherein the pattern of non-adhesive material forms comprises a plurality of dots, lines or combinations thereof.

5. The adhesive article of claim 4 wherein the lines of non-adhesive material have an average width of from about 12μ to about 250μ and an average thickness of from about 30 nanometers to about 100μ.

6. The adhesive article of claim 5 wherein at least 50% of the lines Intersect the end edges of the adhesive layer.

7. The adhesive article of claim 5 wherein a plurality of lines form a grid pattern.

8. The adhesive article of claim 1 wherein the adhesive layer comprises a pressure sensitive adhesive.

9. The adhesive article of claim 1 wherein the adhesive layer comprises a heat-activated adhesive.

10. The adhesive article of claim 1 wherein the non-adhesive material comprises a porous non-adhesive material.

11. The adhesive article of claim 10 wherein the porous non-adhesive material comprises an elastomer.

12. The adhesive article of claim 1 wherein the article is wound so that the patterned lower surface of the adhesive is in adhesive contact with the front surface of the facestock.

13. The adhesive article of claim 12 wherein the front surface of the facestock has a release coating.

14. The adhesive article of claim 1 further comprising a release liner having a release surface, wherein said release surface is adhered to the lower surface of the adhesive layer.

15. The adhesive article of claim 14 wherein the release surface of the release liner has a textured surface.

16. The adhesive article of claim 15 wherein the release surface has a random texture.

17. The adhesive article of claim 15 wherein the release surface has a patterned finish.

18. The adhesive article of claim 16 wherein the lower surface of the adhesive layer has a textured surface that is complementary to the textured surface of the release liner.

19. The adhesive article of claim 14 wherein the release surface of the release liner has randomly distributed non-adhesive particulate material thereon.

20. The adhesive article of claim 19 wherein the randomly distributed non-adhesive particulate material is at least partially embedded into the release surface.

21. The adhesive article of claim 14 wherein the release surface of the release liner has a non-adhesive material printed thereon.

22. The adhesive article of claim 21 wherein the non-adhesive material printed on the release surface of the release liner is embedded into the release surface.

23. The adhesive article of claim 1 further comprising a second adhesive layer having an upper and lower surface, wherein the lower surface of the second adhesive is adhered to the front surface of the facestock.

24. The adhesive article of claim 23 wherein a pattern of non-adhesive material forms is embedded into the upper surface of the second adhesive layer, each of said non-adhesive material forms having a top surface, wherein the top surfaces of the non-adhesive material forms are even with or below the plane of the upper surface of the second adhesive layer.

* * * * *

UNITED STATES PATENT AND TRADEMARK OFFICE
CERTIFICATE OF CORRECTION

PATENT NO. : 7,060,351 B2
APPLICATION NO. : 09/742654
DATED : June 13, 2006
INVENTOR(S) : Michael Hannington It is certified that error appears in the above-identified patent and that said Letters Patent is hereby corrected as shown below:

On Title page (item 57) (Abstract), line 2, replace "a mute, such" with --a route, such--.
On Title page (item 57) (Abstract), line 14, replace "adhesive articles, These" with --adhesive articles. These--.
Column 5, line 31, replace "curves lines, tiled" with --curved lines, tiled--.

Signed and Sealed this

Fifteenth Day of August, 2006

JON W. DUDAS
*Director of the United States Patent and Trademark Office*